Jan. 30, 1951 B. B. JACOBSEN ET AL 2,539,426

AUTOMATIC LEVEL CONTROL ARRANGEMENT IN CARRIER CURRENT COMMUNICATION SYSTEMS

Filed Feb. 26, 1948 4 Sheets-Sheet 1

INVENTORS
BENT B. JACOBSEN
ALLEMAN H. ROCHE
WILFRED F. BALY
BY Robert Harding Jr.
ATTORNEY Jan. 30, 1951 B. B. JACOBSEN ET AL 2,539,426

AUTOMATIC LEVEL CONTROL ARRANGEMENT IN CARRIER CURRENT COMMUNICATION SYSTEMS

Filed Feb. 26, 1948 4 Sheets-Sheet 2

INVENTORS
BENT B. JACOBSEN
ALLEMAN H. ROCHE
WILFRED F. BALY
BY Robert Harding Jr.
ATTORNEY INVENTORS
BENT B. JACOBSEN
ALLEMAN H. ROCHE
WILFRED F. BALY
BY Robert Harding Jr.
ATTORNEY Jan. 30, 1951 B. B. JACOBSEN ET AL 2,539,426

AUTOMATIC LEVEL CONTROL ARRANGEMENT IN CARRIER CURRENT COMMUNICATION SYSTEMS

Filed Feb. 26, 1948 4 Sheets-Sheet 4

INVENTORS
BENT B. JACOBSEN
ALLEMAN H. ROCHE
WILFRED F. BALY
BY Robert Harding Jr.
ATTORNEY Patented Jan. 30, 1951 2,539,426

UNITED STATES PATENT OFFICE 2,539,426

AUTOMATIC LEVEL CONTROL ARRANGEMENT IN CARRIER CURRENT COMMUNICATION SYSTEMS

Bent Bulow Jacobsen, Alleman Holly Roche, and Wilfred Frank Baly, London, England, assignors to International Standard Electric Corporation, New York, N. Y.

Application February 26, 1948, Serial No. 11,196
In Great Britain February 26, 1947

9 Claims. (Cl. 178—44)

The present invention relates to automatic level control arrangements in electric carrier current communication systems.

In carrier current systems operated over cable or open wire circuits, and provided with repeaters at intervals between the terminal stations, it is usual to provide means for automatically adjusting the amplifier gain and line equalisation at the various stations in order to compensate for temperature or other variations in the transmission characteristics of the line. It is customary to transmit over each circuit two (or more) pilot currents of different frequencies which are used to effect the necessary controls at each of the stations.

The signal level controls are carried out principally for two purposes:

(*a*) To maintain the signal levels below a maximum limit which will ensure that no repeater is overloaded, and above a minimum limit which will ensure a sufficiently high signal-to-noise ratio;

(*b*) To maintain the overall transmission equivalent of each channel within the required relatively narrow limits.

It has previously been the practice to apply the one or more pilot currents of different frequencies over each circuit to make the complete adjustment to carry out purposes (*a*) and (*b*) at every repeater. This entails a considerable amount of equipment at the various stations.

The principal object of the present invention is to simplify the controlling equipment by taking advantage of the fact that the requirements for (*a*) and (*b*) above are different. It is found that purpose (*a*) can be carried out by maintaining the signal level at each repeater within about ±1 decibel, while for purpose (*b*) the limits are about ±2 decibels. The simplification of the equipment may therefore be effected by employing one or more pilot currents from one circuit to control the level at the output of each repeater within, say, ±1 decibel, while at the receiving terminal, the repeaters are adjusted, each by its own individual pilot current or currents to within, say, ±½ decibel, according to conventional methods. In view of the relatively wide limits for the level control at the repeaters, it has been found to be possible satisfactorily to control all of the repeaters at any station simultaneously by one or more of the pilot currents transmitted over a particular one of the circuits. It is found that different circuits and repeaters are sufficiently uniform in their properties to permit satisfactory control in this manner.

However, since with this arrangement the failure of the circuit which transmits the controlling pilot current would shut down the whole system, it is desirable for security reasons to have available, at each station, at least two pilot currents transmitted over separate circuits, either of which is capable of simultaneously controlling all of the repeaters at that station.

The two or more pilot currents transmitted over each circuit will be employed in the usual manner at the receiving terminal to adjust the transmission equivalent of each circuit individually over the operating frequency band to within ±½ decibel.

If there are a large number of repeater stations between the two terminals, it may be desirable to arrange for the complete amplification and equalisation adjustment to be carried out by individual pilot currents on each repeater, say at every fifth or tenth repeater station, according to the conventional methods.

Another object of the invention is to provide means whereby at any repeater or terminal station where the complete adjustment is made in the conventional way by individual pilot currents a complete interruption of all the channels on any one cable circuit is prevented in case of failure of the corresponding pilot current by automatically borrowing the pilot current transmitted over one of the other cable circuits. This expedient may be applied to a conventional system in which the complete level adjustment is normally made at every repeater by individual pilot currents transmitted over the corresponding cable circuits.

The invention accordingly provides an electric signal communication system comprising a plurality of circuits each conveying a plurality of carrier current signal channels, a repeater on each of the said circuits at a given station, means for transmitting a pilot current over one of the said circuits, and means at the said station for applying the said pilot current to control the signal level simultaneously on two or more of the said circuits.

The invention will be described with reference to the accompanying drawings, in which.

Figure 1:
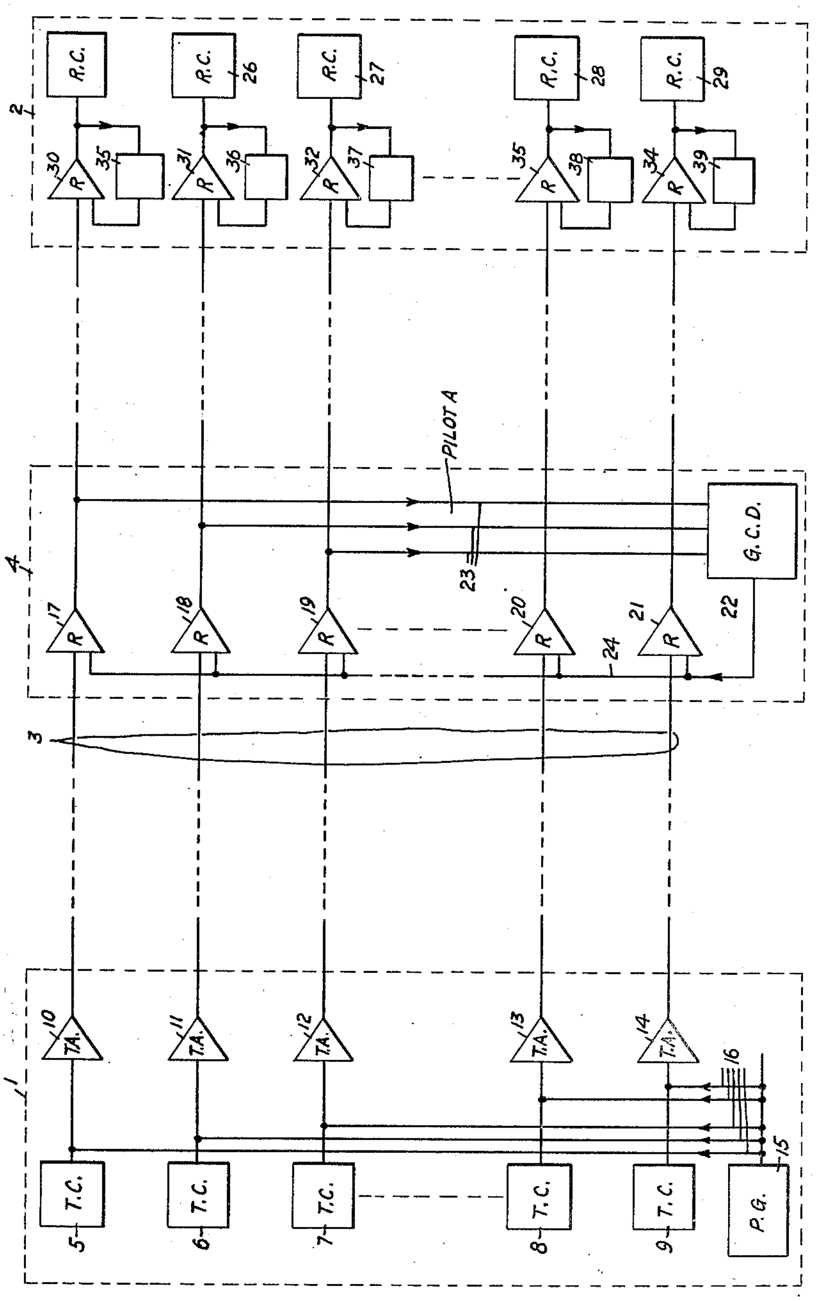
Fig. 1 shows a block schematic circuit diagram of a multi-channel carrier current communication system according to the invention.

In the circuit shown in Fig. 1, two terminal stations 1 and 2 are connected by a cable 3 having a number of separate similar circuits or pairs, of which only five are shown. A repeater station 4 is shown between the two terminal stations, and there may be several other similar repeater stations (not shown). At station 1, each cable circuit is provided with a transmitting circuit of conventional type including all the necessary equipment for modulating the various channel carrier waves with corresponding signals. These transmitting circuits are designated 5 to 9 (inclusive). Transmitting amplifiers 10 to 14 (inclusive) are also provided.

At station 1 a pilot current generator 15 is also provided. This may be of any suitable type, and is intended to supply all the necessary pilot currents at the proper levels to all of the cable circuits over conductors diagrammatically shown at 16. These conductors are each connected between the corresponding transmitting circuit and transmitting amplifier, and it will be understood that each of the conductors 16 may carry two or more pilot currents of different frequencies. For clearness, it will be supposed that two pilot currents of different frequencies, which will be called Pilot A and Pilot B, are supplied to each circuit.

It will be noted that the arrangements at station 1 are entirely conventional.

At the repeater station 4, the cable circuits are equipped with the usual repeaters designated 17 to 21 (inclusive), each of which is assumed to include an amplification and/or equalisation adjusting network, of some suitable type. It will be assumed for clearness that the adjusting element in each network includes one or more indirectly headed thermistors, though various other kinds of adjusting elements could be used.

Figure 2:
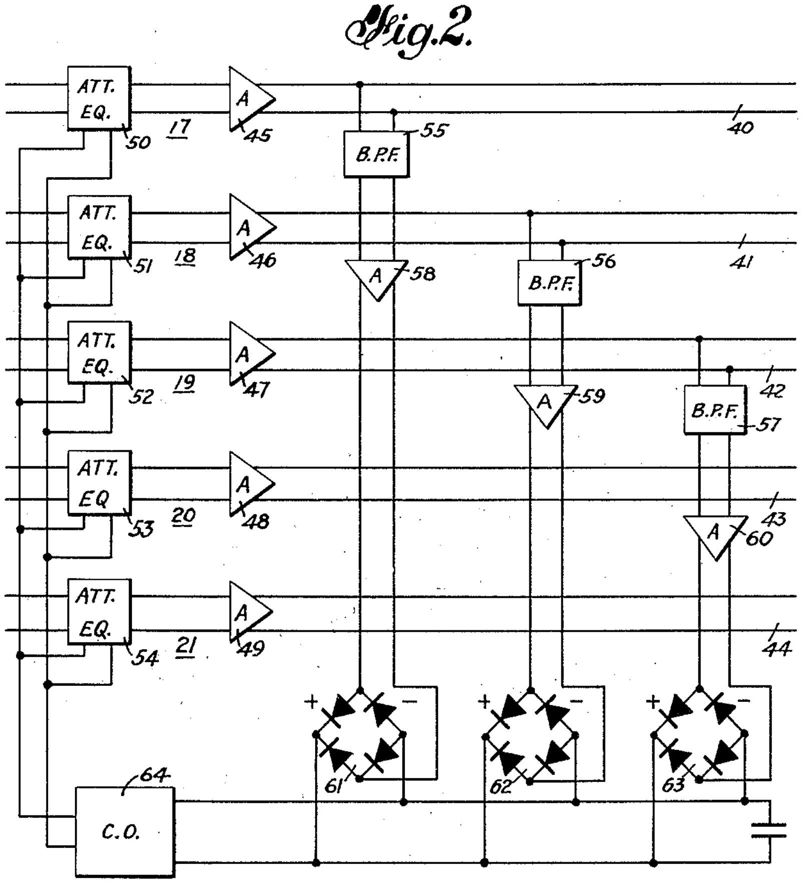
Fig. 2 shows in more detail the repeater station shown in Fig. 1.

A gain control device 22, details of which will be described with reference to Fig. 2, is provided at station 4. This device includes means for diverting a proportion of Pilot A from the output of each of the first three repeaters 17, 18 and 19 over conductors 23. The device 22 is adapted to derive from one of these pilots a control voltage or current which is supplied to repeaters 17, 18 and 19 and also to repeaters 20 and 21, and also to all the other repeaters (not shown) in the station, which are on the same cable. This is indicated diagrammatically by the common conductor 24 connecting the device 22 to each of the repeaters, the control voltage or current operating on the thermistor, or other adjusting element of the gain adjusting network associated with the repeater, in the usual way. It will be understood that the control current or voltage may be applied to the adjusting elements in series or in parallel, or partly in series and partly in parallel, as may be most convenient. This control current or voltage may be alternating or direct.

At the terminal station 2, a completely conventional arrangement is shown, comprising receiving circuits 25 to 29 (inclusive) for each cable circuit, preceded by amplifiers 30 to 34 (inclusive) each of which is provided with an individual gain control device of known type, designated 35 to 39 (inclusive). These devices include all the necessary means for deriving the pilots A and B from the line used for making the final automatic adjustment of the amplification and equalisation of the circuit, according to well known practice.

It should be understood that the gain control device 22 could be operated by a pilot A from only one of the circuits, but as already explained, for security reasons at least two different pilots should be used in order that if one of them fails another can take control. If there are a large number of repeaters at station 4, it may be desirable to divide them into two or more groups each of which group is provided with separate gain control arrangements including a single gain control device 22, in the manner explained.

Fig. 2 shows in more detail the arrangements at the repeater station 4. The five cable pairs shown at 40 to 44 (inclusive) are equipped with the repeaters 17 to 21 (inclusive) shown in Fig. 1. The remaining cable pairs are not shown, but will be arranged in the same way as 43 and 44. The repeaters 17 to 21 comprise amplifiers 45 to 49 (inclusive) respectively preceded by adjustable attenuation equalising networks 50 to 54 (inclusive).

The gain control device 22 includes three bandpass filters 55, 56, 57, respectively bridged across the circuits 40, 41 and 42, and adapted to select the pilot A. The filters supply the corresponding pilots through amplifiers 58, 59 and 60 respectively to the input diagonal terminals of three similar bridge rectifier circuits 61, 62 and 63, the output diagonal terminals of which are applied in parallel to a control oscillator 64. A by-pass condenser 65 shunts the input terminals of the control oscillator 64. The three bridge rectifiers are similarly connected so that the three positive and the three negative output terminals are respectively connected together.

The control oscillator is of the type described in British Patent Specification No. 545,866, and supplies an alternating current to the conductors 66 which varies in accordance with the variations in the rectified pilot voltage produced by one of the bridge rectifiers. The attenuation equalisers 50 to 54 may, for example, be one of the type described in British Patent Specification 469,067, in which the adjustable resistance component is constituted by the resistance element of an indirectly heated thermistor. The conductors 66 are connected to the heating coils of all the thermistors, which may be all in parallel (as shown) or all in series, or partly in series and partly in parallel.

The action of the arrangement is as follows:

In general, although the levels of the three pilot currents are intended to be equal, it will usually happen that the rectified voltage produced by one of the three rectifiers, for example 62, will be slightly greater than that produced by either of the others. This means that the rectifier 62 will block both of the others, so that no effect is produced by the corresponding pilots. It follows that the control oscillator will be operated by the pilot current transmitted over circuit 41. As explained in Specification No. 545,866, the oscillator 64 supplies an alternating current to the thermistors in all the networks 50 to 54, which varies in accordance with the rectified voltage produced by the bridge rectifier 62, and all the networks will be adjusted accordingly in the usual way. However, if the pilot transmitted over circuit 41 should fail, or become abnormally reduced, the rectified voltage produced by the bridge rectifier 62 will fall below the rectified voltage produced by the others and the greater of these voltages, produced, for example, from the bridge rectifier 61, will block the other rectifiers and will take control, so that the attenuation adjustment will be maintained without any interruption. It will be understood that under ordinary conditions when all the pilots are normal there is likely to be a frequent interchange of control between the three pilots, on account of slight variations and differences in the transmission characteristics of the cable circuits and amplifiers. This, however, does not matter since no interruption actually occurs in the control, and all of the cable circuits will be similarly equalised by the single control oscillator. It has already been mentioned that the different circuits and amplifiers are sufficiently uniform in properties to permit the adjustment of any circuit to within the desired limits by a single control.

Each of the attenuation equalisers 50 to 54 could alternatively be placed in a negative feedback path of the corresponding amplifier 45 to 49, as shown, for example, in Specification No. 545,855.

Figure 3:
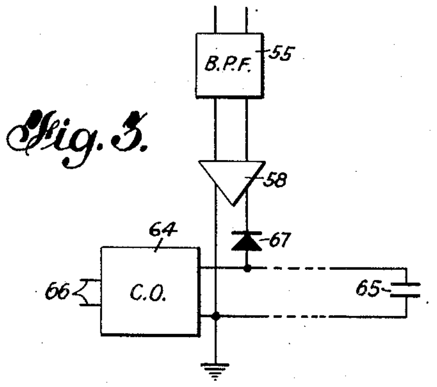
Figs. 3, 4, 5 and 6 show further details of Fig. 1.

The bridge rectifiers in Fig. 2 are adapted for full wave rectification. However, the circuit may be simplified as shown in Fig. 3, which is a modification of part of Fig. 2. The bridge rectifier 61 is replaced by a single rectifier element 67 connected between one output terminal of the amplifier 58 and one input terminal of the control oscillator 64. The other corresponding terminals are connected to ground. The bridge rectifiers 62 and 63 of Fig. 2 are also replaced by single rectifier elements (not shown) in exactly the same way. The rectifier element which produces the highest rectified voltage blocks the other two, as before, so that the corresponding pilot is the one which takes control. Other methods of rectification could also be used.

The thermistor in the equalising network could, if desired, be controlled directly by the rectified voltage produced by the bridge rectifiers 61, 62, 63 (or by the corresponding single rectifier in the Fig. 3 arrangement).

In this case, the control oscillator 64 may be omitted or replaced by a direct current amplifier. Alternatively if the control oscillator 64 is used, its output could be separately rectified and then amplified if necessary by a direct current amplifier. If there are a large number of circuits in the cable, a considerable amount of power will be required simultaneously to operate all the corresponding thermistors, and some amplification of the control current or voltage may be necessary in this case.

Figure 4:
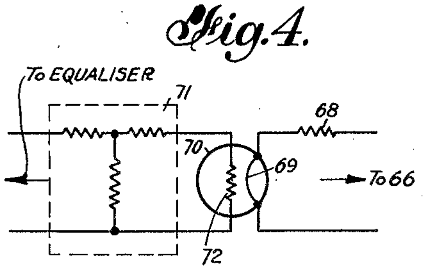

It will be evident that when thermistors are used as the adjustable elements in the attenuation equalisers, the characteristics of different thermistors must be closely similar, otherwise the various circuits will be incorrectly equalised. If it is found that commercial thermistors are insufficiently uniform in properties the difficulty could be overcome by selection of individual thermistors to suitable limits, or by forming pairs of thermistors with their resistance elements and heating coils connected respectively in series or in parallel to produce compound thermistors of specified characteristics. Alternatively, the thermistor may be provided with compensating means as indicated in Fig. 4.

The resistance of a thermistor at any temperature $t$ is given approximately by $R=R_0e^{-kt}$, and different thermistors of the same type will differ within certain limits principally in the value of $R_0$ and in the thermal efficiency that is, in the value of $t$ produced by a given heating power. The latter effect can be compensated by connecting a resistance 68 in series with the heating coil 69 of the thermistor 70, so adjusted that the thermistor reaches a given temperature with a given control voltage on the conductors 66. Variations in the value of $R_0$ for any given control voltage may be compensated by means of an adjustable T-type attenuating pad 71, this pad being connected between the resistance element 72 of the thermistor 70 and the terminals for the variable resistance in the attenuation equaliser.

This attenuating pad will be a transforming pad having a fixed loss of about 5 decibels for instance, but with an adjustable transforming ratio, so that with a given applied control voltage, the thermistor resistance as seen through the pad has a specified value. The transforming ratio of the pad should be approximately equal to 1 for an average thermistor.

Figure 5:
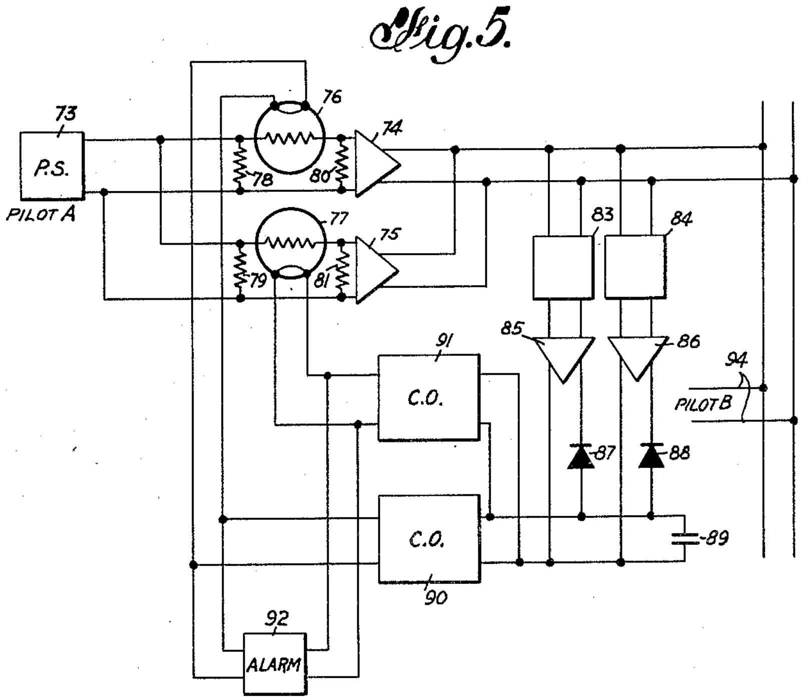

Fig. 5 shows a preferred form of the pilot generator 15 at the terminal station 1 of Fig. 1. In this figure, 73 is a pilot current source generating a frequency corresponding to pilot A. This source should preferably be provided with duplicate oscillators, with automatic switching arrangements such as those described in British Patent Specification No. 536,454, for replacing one by the other in case of failure.

To the output of the source 73 are connected in parallel two level adjusting circuits comprising respectively amplifiers 74 and 75 preceded by adjustable attenuators comprising series indirectly heated thermistors 76 and 77, and shunt resistances 78, 79, 80 and 81. The outputs of the amplifiers 74 and 75 are connected to conductors 82. Bridged across these conductors are a pair of band-pass filters 83 and 84 adapted to select the Pilot A, followed duplicate amplifiers 85 and 86, duplicate rectifiers 87 and 88 and a condenser 89, arranged as described with reference to Fig. 3, and connected to two control oscillators 90 and 91 arranged in parallel. These control oscillators may be of the same type as 64 in Fig. 2.

The oscillators 90 and 91 should be adjusted to supply equal alternating currents to the heating coils of the thermistors 76 and 77 respectively. The arrangement supplies a regulated pilot voltage to conductors 82, the regulation being actually controlled by one of the rectifiers 87, 88, the other being blocked, as previously described. If one of the elements 83 to 88 in one of the branch circuits develops a fault, the other branch circuit maintains the control. Likewise, if one of the control oscillators 90, 91, or one of the amplifiers 74, 75, fails, the pilot level is readjusted to the proper valve by the thermistor which is associated with the element which has not failed. If desired, a differential alarm circuit 92 of any suitable type may be shunted across the output circuits of the two control oscillators 90 and 91 as indicated, in order to give notice when one of these oscillators has failed.

The conductors 82 are connected to a pilot line 93 to which is also connected an exactly similar pilot control circuit (not shown) for the pilot B over conductors 94, which differs from Fig. 5 only in that pilot source corresponding to 73 generates the frequency corresponding to pilot B instead of that corresponding to pilot A, and the filters 83 and 84 are modified accordingly. If there are more than two pilots, similar arrangements are provided for each, and the outputs of all the pilot control circuits are multiplied to the pilot line 93, either directly, as shown, or through hybrid coil networks. If necessary the various pilots may be applied to the pilot line 93 through corresponding band pass filters, (not shown). The conductors 16 shown in Fig. 1 are all connected to this pilot line.

Figure 6:
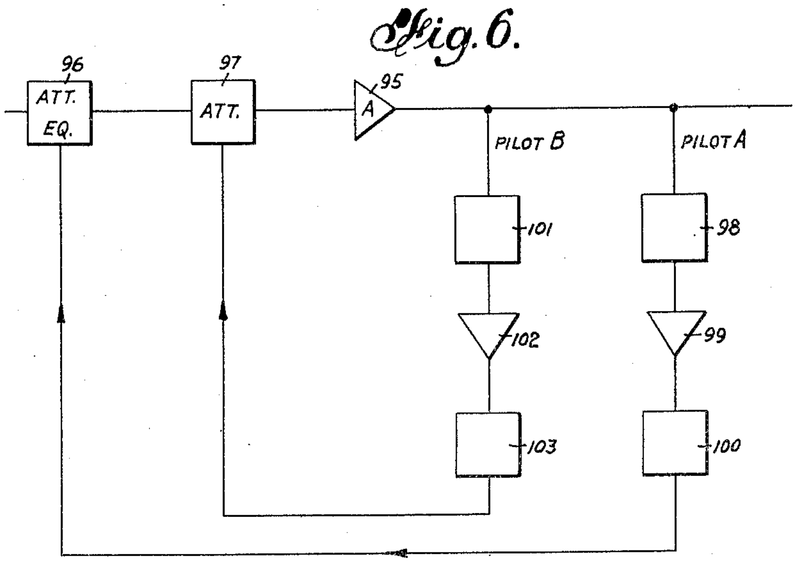

Fig. 6 shows in more detail the level control arrangements for each one of the repeaters at the terminal station 2 of Fig. 1. The amplifier 95 is preceded by an attenuation equalising network 96 which may be similar to those of Fig. 2, and followed by a simple attenuator 97 for making a level adjustment which is the same at all frequencies. This attenuator could precede the amplifier 95, if desired. The attenuation equaliser 96 is controlled by a circuit including a band-pass filter 98 for selecting pilot A, an amplifier 99 and a control circuit 100, which may include a rectifier and a control oscillator similar to 64. A similar series of elements 101, 102, 103 controls the attenuator 97, the filter 101 however being designed to select pilot B. The equalising network 96 could alternatively be in the feedback path of the amplifier 95. All the elements of Fig. 6 are well known.

Figure 7:
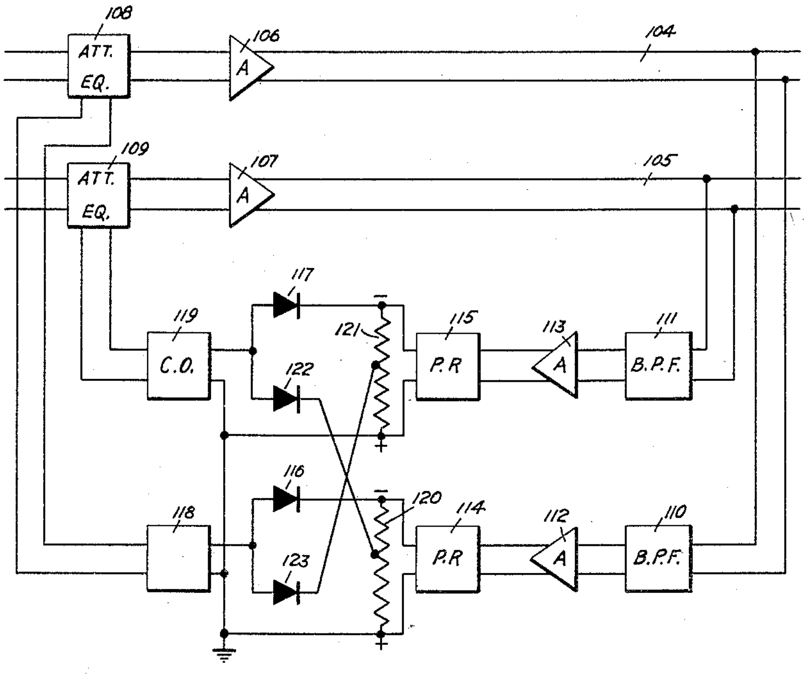
Fig. 7 shows a block schematic circuit diagram of another embodiment of the invention.

Fig. 7 shows a different application of the invention. Two of the cable circuits 104 and 105 at a repeater or terminal station are shown, the other circuits being omitted. The circuits 104 and 105 are equipped with repeaters comprising respectively amplifiers 106 and 107 preceded by attenuation equalisers 108 and 109. The corresponding control circuits for the equalisers comprises band-pass filters 110 and 111 for selecting the corresponding pilot, amplifiers 112 and 113, and pilot rectifier circuits 114 and 115, all of conventional pattern. It will be supposed that each of the rectifier circuits 114 and 115 produces an unbalanced rectified voltage which is negative to ground. These unbalanced voltages are applied respectively through 116 and 117 to control oscillators 118 and 119 which may for example be of the same type as the oscillator 64 of Fig. 2. These oscillators respectively control the attenuation equalisers 108 and 109 as previously described.

The output of the pilot rectifiers 114 and 115 are respectively shunted by resistances 120 and 121. A tap on the resistance 120 is connected across to the input of the control oscillator 119 through a rectifier 122, while a tap on the resistance 121 is connected across to the input of the control oscillator 118 through a rectifier 123. The rectifiers 122 and 123 have their anodes connected to the anodes of the rectifiers 117 and 116 respectively. The taps on the resistances 120 and 121 should be chosen so that the voltages applied to the corresponding rectifiers are the same fraction of the total rectified voltages. This fraction should preferably be only slightly less than 1, say 0.98; in fact the fraction could be actually equal to 1, or in other words, the taps could be at the upper ends of the resistances 120 and 121.

It will be clear, therefore, that when the pilots on both circuits 104 and 105 are normal, both of the rectifiers 122 and 123 will be blocked, because each will have a larger negative voltage applied to its anode through the corresponding rectifier 117 or 116, than to its anode through the corresponding rectifier 117 or 116, than to its cathode. The rectifiers 122 and 123 can therefore be disregarded, and each pilot controls the corresponding attenuation equaliser independently of the other in the usual way. However, if, for example, the pilot level in circuit 104 should for any reason fall abnormally so that the total rectified voltage falls below 0.98 of the normal value, then rectifier 123 conducts, and transfers the rectified pilot voltage derived from circuit 105 to operate the control oscillator 118. In other words, if the pilot current on circuit 104 should fail, the pilot from circuit 105 is automatically borrowed, and carries out the level adjustment instead of the pilot which has failed, or prevents an unjustifiable increase in the amplification of 106. It will be evident that if the pilot on circuit 105 should fail instead, then the pilot on circuit 104 will be automatically borrowed in like manner.

It will be clear, that each pair of circuits in the cable may be equipped in this manner so that each lends the pilot to the other in the event of failure of its pilot. Atlernatively, or in addition, one of the circuits such as 104 may be arranged to lend its pilot to any of several other circuits, by providing each of such other circuits with a rectifier such as 123 connected between the tap on resistance 120 and the anode of the rectifier corresponding to 117. It will be evident therefore, that in such a case the tap on resistance 120 will have several rectifiers such as 123 connected thereto, but under normal circumstances all of them will be blocked.

It will be clear that if the rectified voltage produced by the pilot rectifier circuits such as 114 and 115 is of the opposite sign, all of the rectifiers should be reversed.

If more than one pilot is employed in the adjustment of each cable circuit, then the corresponding additional pilot control circuits may be separately equipped with rectifiers and shunt resistances in the manner explained.

The arrangement described with reference to Fig. 7 may be used at any repeater or terminal station, and is intended to provide an additional safeguard against failure in the case where each cable circuit is normally controlled by an individual pilot or pilots transmitted thereover. Its purpose therefore differs from the principal purpose of the arrangement of Fig. 2, which is intended to economise apparatus by providing for each circuit to be normally controlled by a pilot which is in general transmitted over some other circuit.

In Fig. 7, the two circuits 104 and 105 may be the go and return circuits of the same channel, but it is preferable that they should be circuits which both transmit in the same direction.

Figure 8:
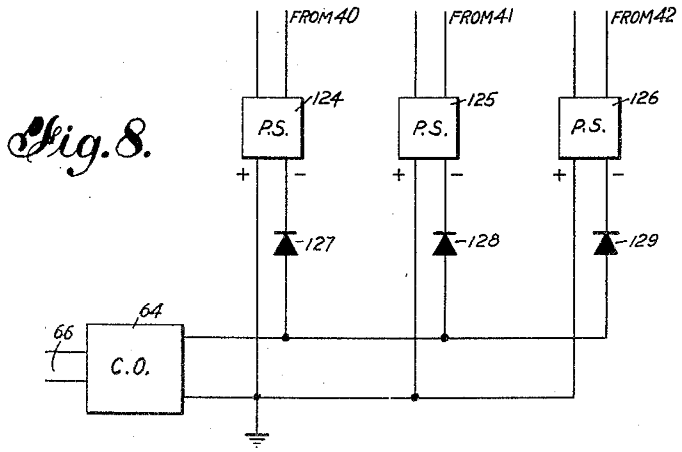
Fig. 8 shows details of a modification of Fig. 1.

Fig. 8 shows a modification of part of Fig. 2 which has a feature of Fig. 7. The pilot A is obtained from the circuits 40, 41 and 42 of Fig. 2 by means of three respective pilot selectors 124, 125 and 126. Each of these pilot selectors comprises elements similar to 110, 112 and 114 of Fig. 7, and generates a rectified unbalanced negative control voltage of its output. The rectified control voltages from the outputs of the three pilot selectors are applied respectively through rectifiers 127, 128 and 129 to the input of the control oscillator 64, which supplies the control oscillations over conductors 66 to all the equalisers as already explained with reference to Fig. 2.

The three rectifiers act according to the principles already explained. If, for example, the pilot selector 125 produces a slightly higher rectified voltage than the others, rectifiers 127 and 129 will be blocked and the pilot from circuit 41 takes control. Should this pilot fail, then rectifier 128 becomes blocked and one of the others takes over. This arrangement differs from that shown in Fig. 2 simply in the provision of the extra rectifiers 127, 128 and 129 for blocking all the controls except one. In Fig. 2 the rectifiers combine the rectifying and the blocking functions.

It will be evident that the control oscillator 64 in Fig. 8 could be omitted, or replaced by a direct current amplifier.

It will of course be understood the blocking of the rectifiers used in the circuits of this invention does not take place suddenly at some value of the applied voltage, but requires a small range of applied voltage for the increase in resistance to be completed.

What is claimed is:

1. An electric signal communication system comprising a given repeater station common to a plurality of circuits each conveying a plurality of carrier current signal channels, a repeater on each of said circuits at said given station, means for transmitting a first pilot current over one of said circuits, means for transmitting a second pilot current over another of said circuits, means at said station for selecting said first and second pilot currents, means at said station for applying to said plurality of circuits a control current corresponding only to said first pilot current to control the signal level simultaneously on said circuits, and means responsive to a change in said first pilot current for applying to said plurality of circuits a control current corresponding only to said second pilot current to transfer automatically the control to said second pilot current.

2. An electric signal communication system comprising two terminal stations and at least one intermediate repeater station connected by a plurality of transmission circuits each conveying a plurality of carrier current signalling channels, means for transmitting over each circuit a pilot current for controlling the overall transmission equivalent thereof, line equalising means associated with each circuit at said repeater station, means at said repeater station for selecting a pilot current from each of two of said circuits, normally unblocked means for supplying to the equalising means of said circuits a common control current corresponding to only one of the selected pilot currents, and normally blocked means unblocked by a decrease in said one pilot current for supplying to the equalising means of all said circuits a common control current corresponding only to the other selected pilot current to transfer automatically the control to said other selected pilot current.

3. An electric signal communication system comprising two terminal stations and at least one intermediate repeater station connected by a plurality of transmission circuits each conveying a plurality of carrier current signalling channels, means for transmitting over each circuit a pilot current for controlling the overall transmission equivalent thereof, line equalising means associated with each circuit at said repeater station, means at said repeater station for selecting a pilot current from each of two of said circuits, first rectifying means for rectifying one of said selected pilot currents, second rectifying means for rectifying the other of said selected pilot currents, means for blocking said first rectifying means including means for connecting said first and second rectifying means in parallel, and connecting means for applying to said equalising means the rectified voltage derived from the unblocked second rectifying means.

4. A system according to claim 3 in which the said rectified voltage is applied to a control oscillator, the output oscillations of which are supplied to the heating coils of a plurality of indirectly heated thermistors, the resistance elements of which are connected respectively in the line equalising means.

5. A system according to claim 3 in which said first and second rectifying means comprises two bridge rectifiers corresponding respectively to each of the selected pilot currents, the output circuits of said bridge rectifiers being connected in parallel.

6. A system according to claim 5 in which there is provided a separate rectifier in series with the output circuit of each bridge rectifier, whereby the highest of said rectified voltages blocks the separate rectifier corresponding to the other rectified voltage.

7. An electric signal communication system comprising a plurality of multi-channel carrier current circuits connecting a transmitting station with at least one intermediate station, means for transmitting over each circuit at least one pilot current having a given frequency for normally controlling the signal level on that circuit only, and means at said intermediate station including a normally blocked coupling device operable in response to an abnormal reduction of pilot current in one of said circuits for borrowing a pilot current from a second one of said circuits to control the signal level on said one circuit.

8. An electric signal communication system comprising a plurality of multi-channel carrier current circuits connecting a transmitting station with at least one intermediate station, means for transmitting over each circuit at least one pilot current having a given frequency for normally controlling the signal level on that circuit only, means at said intermediate station responsive to an abnormal reduction of pilot current in a first one of said circuits for borrowing a pilot current from a second one of said circuits to control the signal level on said one circuit, first level controlling means associated with said first circuit, second level controlling means associated with said second circuit, first and second rectifiers coupled to said first and second circuits respectively for developing a rectified voltage from each of the corresponding pilot currents, a normally unblocked third rectifier coupled to said first level controlling means, a normally blocked fourth rectifier coupled to said first level controlling means, means for applying the rectified pilot voltage corresponding to the pilot current in said first circuit through said third rectifier to said first level controlling means, said borrowing means including means for applying a fraction of the rectified voltage developed by said second rectifier through said fourth rectifier to said first level controlling means when the rectified voltage developed by said first rectifier is less than said fraction of the said rectifier voltage developed by said second rectifier.

9. A system according to claim 8 in which the rectified voltage developed by each of said third and fourth rectifiers is applied alternatively to a respective control oscillator connected to the heating coil of an indirectly heated thermistor having its heating element connected in an attenuation equalising network associated with said level controlling means.

BENT BULOW JACOBSEN.
ALLEMAN HOLLY ROCHE.
WILFRED FRANK BALY.

REFERENCES CITED

The following references are of record in the file of this patent:

UNITED STATES PATENTS

| Number | Name | Date |
|---|---|---|
| 2,208,617 | Wilson | July 23, 1940 |
| 2,254,205 | Bollman | Sept. 2, 1941 |